April 7, 1925.
E. HIGGINS
1,532,183
SHAFT COUPLING
Filed Aug. 6, 1923
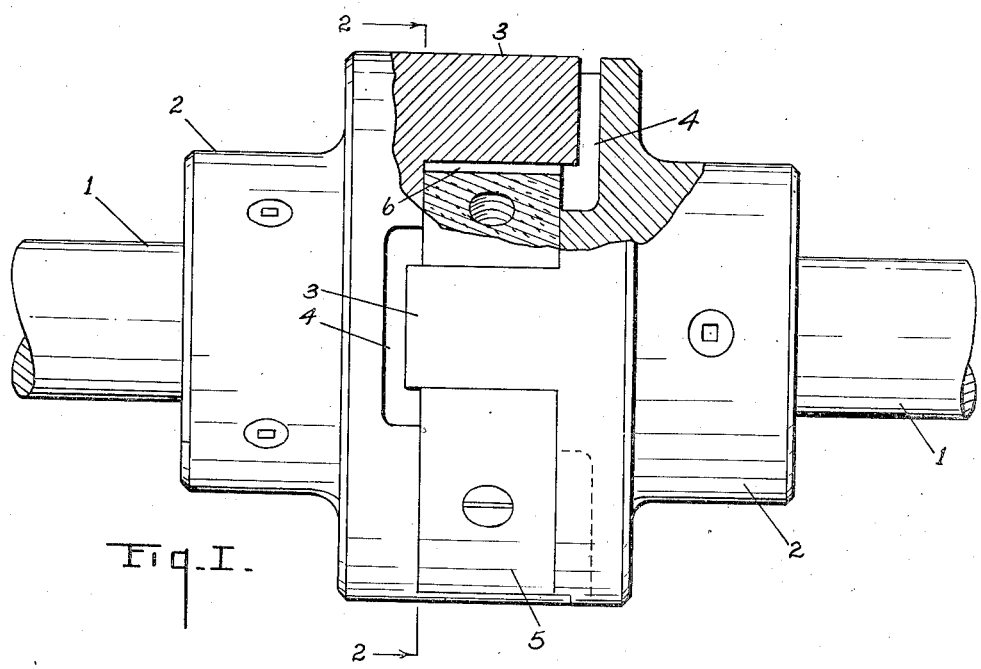
Fig. I.
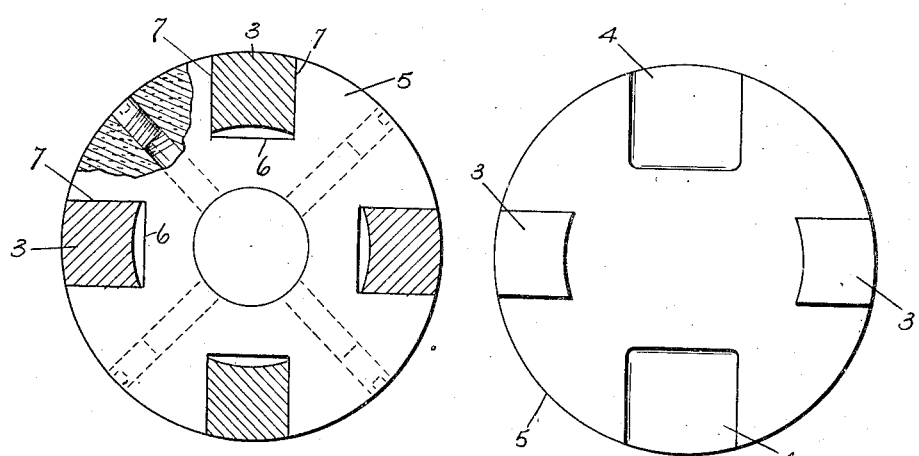
Fig. II.
Fig. III.
Eugene Higgins
INVENTOR.
BY
Chappell↑Earl
ATTORNEYS Patented Apr. 7, 1925.

1,532,183

UNITED STATES PATENT OFFICE.

EUGENE HIGGINS, OF JACKSON, MICHIGAN.

SHAFT COUPLING.

Application filed August 6, 1923. Serial No. 655,983.

*To all whom it may concern:*

Be it known that I, EUGENE HIGGINS, a citizen of the United States, residing at the city and county of Jackson, State of Michigan, have invented certain new and useful Improvements in Shaft Couplings, of which the following is a specification.

This invention relates to improvements in shaft couplings.

My present improvements are especially designed by me for embodiment in shaft couplings embodying the features of Letters Patent No. 1,413,117, issued to me on April 18, 1922, and I have illustrated the same as embodied in such a structure. My improvements are, however, adapted and desirable for use in shaft couplings of this general type.

The main object of this invention is to provide an improved shaft coupling embodying a coupling member of fibrous material which is very durable.

A further object is to provide an improved shaft coupling in which the parts are subjected to uniform wear.

Objects pertaining to details and economies of my improvements will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this application, in which:

Fig. I is a side view of my improved shaft coupling, parts being shown in partially broken longitudinal section and the shaft sections being broken away.

Fig. II is a transverse section on a line corresponding to line 2—2 of Fig. I with parts broken away to better show the structural details.

Fig. III is an end elevation of one of the shaft members.

In the drawing similar reference numerals indicate similar parts in all of the views.

Referring to the drawing, 1, 1 represent the shaft sections to be coupled. The shaft members 2, 2 are duplicates, the same being adapted to receive the shaft sections 1.

Each shaft member is provided with a pair of driving lugs 3 disposed oppositely and a pair of recesses 4, the planes of the driving lugs of the two shaft members being at right angles when the shaft members are in assembled relation.

The cruciform coupling member 5 has slot-like radial bearing openings 6 therein coacting with the driving lugs 3 of both shaft members, the sides of the lugs being in bearing engagement with the bearing surfaces 7 of the coupling member. These bearing lugs are of such length that they extend entirely through the coupling member and project into the recesses 4 of the coacting coupling member, the recesses being of such dimensions that their walls are not engaged by the driving lugs.

By this arrangement there is a complete bearing engagement of the driving lugs with the coupling member throughout the flexing movement of the parts. This is a particularly desirable feature where the coupling members are formed of fibrous material, for instance such as the fibrous material "Textoil" described in my said Letters Patent above referred to, as the wear is uniformly distributed on the bearing surfaces.

While I preferably employ a coupling member of fibrous material, my improvements are desirable for use with coupling members formed of metal.

Having thus described my invention what I claim as new and desire to secure by Letters Patent is:

1. A shaft coupling comprising a pair of shaft members, each having driving lugs and recesses adapted to receive the driving lugs of the other member, and a cruciform coupling member coacting with the lugs of both shaft members, said coupling member being formed of fibrous material, said driving lugs projecting through said coupling member and into the said recesses of the other member whereby there is a bearing engagement of the driving lugs with the coupling member extending entirely across the same, 2. A shaft coupling comprising a pair of shaft members, each having driving lugs and recesses adapted to receive the driving lugs of the other member, and a cruciform coupling member coacting with the lugs of both shaft members, the lugs projecting beyond the coupling member and into said recesses, said recesses being of such dimensions that the walls thereof are not engaged by the driving lugs.

In witness whereof, I have hereunto set my hand.

EUGENE HIGGINS. [L. S.]